United States Patent [19]

Jackman

[11] 4,097,698

[45] Jun. 27, 1978

[54] SEISMONASTIC SWITCHES WITH INERTIA RESPONSIVE CONTROLLER

[75] Inventor: Peter Ronald Jackman, Basingstoke, England

[73] Assignee: Inertia Switch Limited, United Kingdom

[21] Appl. No.: 665,245

[22] Filed: Mar. 9, 1976

[30] Foreign Application Priority Data

Mar. 12, 1975 United Kingdom ............... 10344/75

[51] Int. Cl.$^2$ ...................... H01H 35/10; G01P 15/00

[52] U.S. Cl. ............................... 200/61.45 R; 73/492; 137/38; 200/61.5

[58] Field of Search .......................... 200/61.45–61.53, 200/61.86, 153 T, DIG. 29; 70/243; 251/76; 180/103, 104; 137/456, 38; 123/198 DB; 73/492

[56] References Cited

U.S. PATENT DOCUMENTS

| | | | |
|---|---|---|---|
| 1,339,798 | 5/1920 | Thompson | 123/198 DB |
| 1,662,979 | 3/1928 | Nelson | 200/61.52 |
| 1,691,836 | 11/1928 | Agatz | 200/61.52 |
| 2,683,194 | 7/1954 | Mathisen | 200/61.45 R |
| 2,949,855 | 8/1960 | Saunderson | 200/61.45 R X |
| 3,521,652 | 7/1970 | Reeks | 200/61.45 R X |
| 3,550,717 | 12/1970 | Doty, Jr. | 200/61.45 R X |
| 3,578,006 | 5/1971 | Betz, Jr. | 137/38 |
| 3,626,764 | 12/1971 | Prachar | 200/61.45 R X |
| 3,628,384 | 12/1971 | Jones | 200/61.45 R X |
| 3,715,003 | 2/1973 | Jubenville | 200/61.45 M X |
| 3,723,681 | 3/1973 | Haruna et al. | 200/61.53 |
| 3,769,472 | 10/1973 | Bell et al. | 200/61.52 X |
| 3,812,308 | 5/1974 | Bell et al. | 200/61.52 X |
| 3,816,680 | 6/1974 | Suzuki | 200/61.52 X |
| 3,859,650 | 1/1975 | Prachar | 200/61.53 X |
| 3,927,286 | 12/1975 | Fohl | 200/61.52 X |

FOREIGN PATENT DOCUMENTS

| | | | |
|---|---|---|---|
| 2,343,118 | 4/1974 | Germany | 200/61.45 R |
| 2,060,281 | 6/1971 | Germany | 200/153 T |
| 623,922 | 5/1949 | United Kingdom. | |
| 1,456,972 | 12/1976 | United Kingdom. | |
| 1,445,690 | 8/1976 | United Kingdom. | |
| 1,440,771 | 6/1976 | United Kingdom. | |
| 1,440,772 | 6/1976 | United Kingdom. | |

*Primary Examiner*—James R. Scott
*Attorney, Agent, or Firm*—Foster York; George H. Lee

[57] ABSTRACT

A seismonastic control apparatus has a ball mounted in a concavity for unobstructed movement into contact with a displaceable disc which actuates a two-mode control device on predetermined tilting or shock loading of the apparatus.

To increase the kinetic energy of the ball and thus facilitate displacement of the disc, the seat is formed with a circular region at which the inclination of the seat to the central axis of the apparatus increases. As the ball crosses this region it is accelerated more rapidly because its path becomes more closely aligned with the resultant force acting on the ball.

12 Claims, 3 Drawing Figures

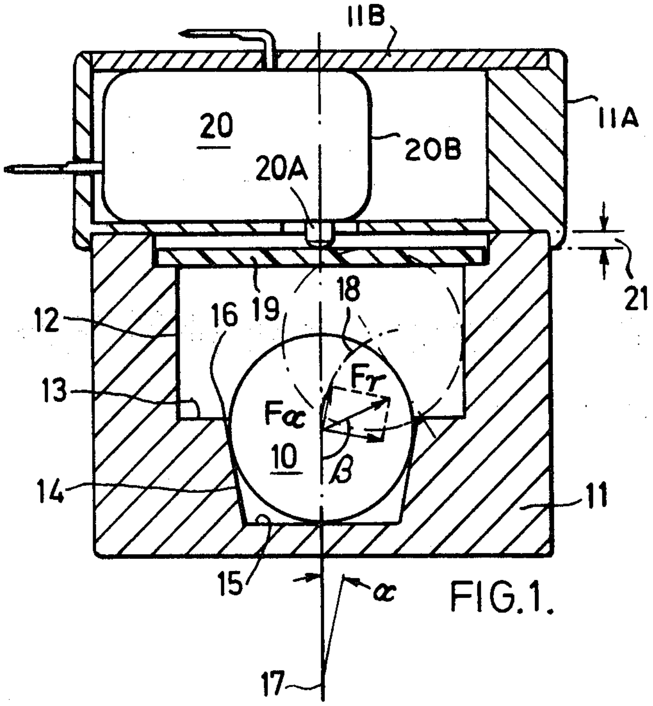
FIG.1.
FIG.2.
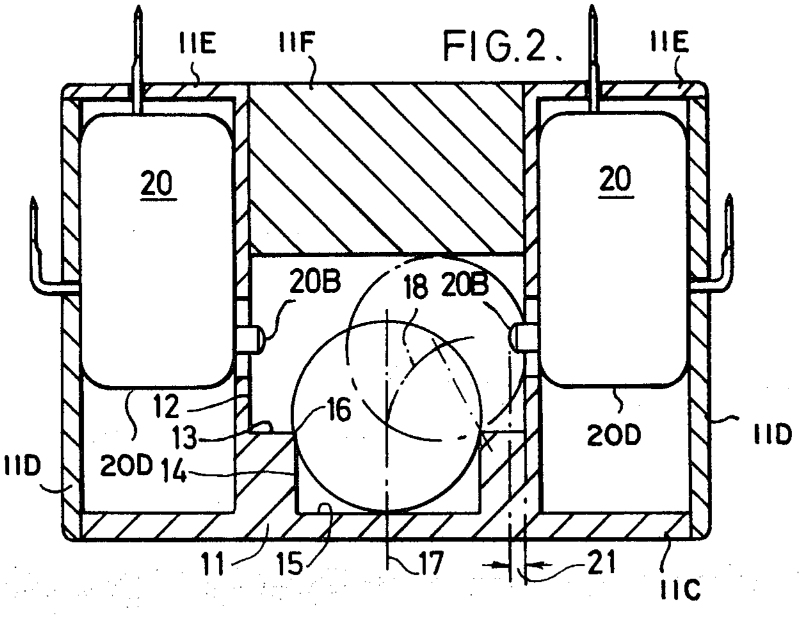

SEISMONASTIC SWITCHES WITH INERTIA RESPONSIVE CONTROLLER

BACKGROUND OF THE INVENTION

The invention relates to a seismonastic control apparatus in which a seismic mass mounted in a concave seat is movable from a rest position, in response to a variation of predetermined magnitude in the resultant force acting on the seismic mass, to effect a mechanical or electrical switching operation.

In one most effective form of seismonastic switching device constructed in accordance with this principle, a seismic ball is mounted in a frustoconical seat. When the device is subjected to a lateral acceleration, as a result of a lateral shock loading on the device, the ball is accelerated relative to the seat in a direction opposite to the shock loading on the device. The ball therefore behaves as if acted upon by a lateral force which is oppositely directed and proportional to the shock loading on the device. If the resultant of this notional lateral force and the downward gravitational force acting on the ball passes outside the support base defined by the zone of contact between the ball and frusto-conical seat, the ball accelerates up the side of the seat, at a rate proportional to the component of the resultant force acting parallel to the side of the seat, and into contact with a switch member. The switch member is a displaceable member such as a plunger which is depressed by the ball, the acceleration of the ball ensures that sufficient kinetic energy is rapidly imparted to the ball to depress the plunger so as to effect a mode-changing operation of the switching device.

For a seismonastic switching device such as this, in which the sides of the frusto-conical seat are inclined at an angle $\alpha$ to the central axis of the seat and the seismic ball is subjected to a resultant force $F_r$ inclined at an angle $\beta$ to the central axis of the seat, the component $F_\alpha$ of the resultant force $F_r$ tending to drive the ball along the side of the seat may be expressed as follows:

$$F_\alpha = -F_r \cos(\alpha + \beta)$$

Thus, if $(\alpha + \beta)$ exceeds 90°, the resultant force $F_r$ will urge the seismic ball out of its seat with an acceleration proportional to the component force $F_\alpha$, so that a seismonastic switching device in which the sides of the frusto-conical seat have a particular inclination, angle $\alpha$, is responsive to the inclination, angle $\beta$, of the resultant force $F_r$ acting on the seismic ball.

In practice, this principle is utilised to operate seismonastic switching devices in response to the variation in inclination of a resultant force acting on a seismic ball mounted in a frusto-conical seat when this variation in inclination results either from the imposition of a lateral shock loading on the gravitational force acting on the ball, as in shock loading responsive device, or from the tilting of the switch so as to alter the inclination of the line of action of the gravitational force acting on the seismic ball, as in roll-over switching devices.

In order to ensure that a device constructed so as to operate according to this principle does not operate in response to stimuli of less than a particular threshold value; for example, for variations of less than 15° in the inclination of the resultant force acting on the seismic ball; so as to reduce the sensitivity of the device it is necessary to reduce the angle $\alpha$ so as to increase the steepness of the sides of the frusto-conical seat. However, this form of construction suffers the disadvantage of the slow response normally obtained as a result of the finite time necessary for the seismic ball to accelerate to an acceptable velocity; for example, a velocity at which its kinetic energy is sufficient to do the work required for depression of a plunger.

One way of reducing this disadvantage is to use a seismic ball of ferromagnetic material and to impose a magnetic restraint on the ball by means of a magnet disposed below the frusto-conical seat. This restraint of the seismic ball, by magnetic attraction, is such that it prevents premature departure of the seismic ball from its rest position until the device is subjected to a stimulus in excess of the desired threshold value. This restraint also diminishes rapidly as the ball moves away from its rest position, thereby increasing the resultant force component urging the ball up along the side wall of its seat and so shortening the time taken for the ball to reach the required velocity or acquire sufficient kinetic energy to depress a plunger.

However, in spite of considerable shortening of the response time by means of the magnetic restraint imposed on the seismic ball, so that response times, in typical cases, are divided by factors of between 10 and 20, even greater reductions in response time are required in many applications such as in seismonastic control apparatus for operating safety devices in response to motor vehicle collisions.

SUMMARY OF THE INVENTION

It is therefore an object of the present invention to provide a less complicated form of seismonastic switching device which will not operate unless actuated by a stimulus of predetermined magnitude, but when so actuated will operate more rapidly than a conventional seismonastic switching device in which a seismic ball is mounted for movement along a frusto-conical surface of seat.

According to the invention, there is provided a seismonastic control apparatus having a switching device comprising a concave seat, a spherical seismic roller accommodated in the seat, for unobstructed movement from a rest position on the central axis of the seat to an operative position as the result of a predetermined variation in a resultant of all forces acting on the roller, and a displaceable member which is engaged by the roller when in its operative position and moved away from the seat, and retaining means provided by the housing to insure sufficient axial movement of said displaceable member to effect actuating movement of a plunger of a two-mode control device, and the seat comprising a concave surface including a circular region which is engaged by the seismic roller during said movement from its rest position to its operative position and at which there is an increase in the inclination of the surface of the seat to the central axis so that, in any axial plane, the increased inclination is greater than the inclination of the tangent to the roller at the point of contact between the roller and the seat when the roller is in its rest position.

When a seismonastic switching device such as this is subjected to a variation in the resultant force acting on the seismonastic roller so that the roller is subjected to a force component acting parallel to the surface of the seat engaged by the roller, the roller will accelerate out of its rest position. However, at the instant when the roller comes into engagement with the region of the surface of the seat at which there is an increase in the inclination of this surface to the central axis, the roller will change its direction of movement so as to become more closely aligned with forces acting on the it and there is a consequential increase in the force component urging the roller along the surface of the seat. This increased loading on the roller gives rise to a greater acceleration of the roller and so the roller moves more rapidly into its operative position.

In a preferred embodiment of the invention, the displaceable member to its operative position, is displaceable by the roller from a first position to a second position to effect operation of the apparatus whenever the roller moves from its rest position to its operative position. With this form of construction, the increased loading on the roller, as the roller passes over the region of the surface of the seat at which there is an increase in the inclination of the surface to the first axis, gives rise to a greater acceleration of the roller and so the roller acquires sufficient kinetic energy to depress the plunger more rapidly than would otherwise be the case.

A seismonastic switching device, as hereinbefore described, in which the roller is required to depress a displaceable member, is particularly suitable for use as a roll-over switch for preventing fuel spillage when a motor vehicle rolls over.

The surface of the seat is formed as a surface of revolution extending around the central axis and it is preferable, for both operational and constructional reasons, to form the region at which the surface of the seat increases in inclination to the central axis of the device as a sharp edge or as a plurality of sharp edges where each such edge extends along a circular line. However, it is not necessary that there should be a step-change in inclination at this region and the region may be arcuate in cross-section so as to provide a gradual transition in the inclination of the surface.

Although the surface of the seat disposed within the region at which the inclination of the seat surface to the central axis of the device increases may be frusto-conical in shape, so that the diameter of the edge of this frusto-conical surface is greater than the diameter of the seismic ball, it is preferable to form this region as a sharp edge with a diameter smaller than the seismic roller and, in this case, the surface of the seat within this sharp edge is most conveniently formed as a cylindrical surface. Thus, in the simplest form of construction, the seat may be formed simply by drilling a cylindrical hole perpendicularly into a flat, planar surface.

Where it is necessary to provide a high-speed control apparatus suitable for use with devices requiring more energy for operation than is available from a seismonastic switching device, as hereinbefore described, it is necessary to include a trigger mechanism in the two-mode control device.

One such trigger mechanism suitable for this purpose comprises an elongate trigger member which constitutes the plunger and is actuable by the displaceable member of the switching device and axially reciprocable along a trigger axis extending parallel to an imaginary axis extending parallel to the central axis of the switching device a plunger a tubular part surrounding the trigger member and reciprocable along said plunger axis, biasing means for urging the tubular part in one direction along said plunger axis, and at least one sear member disposed between the trigger member and the tubular part and movable transversely of said plunger axis, the tubular part being formed with an inclined surface for co-operating engagement with one side of said sear member, to urge said sear member towards the trigger member and the trigger member being formed with an abutment surface for engagement with said sear member to prevent said transverse movement and formed with a rebated portion of reduced cross-section which is axially spaced from the abutment surface, on the same side of the abutment surface as the displaceable member of the switching device.

Thus, on movement of the trigger member along said plunger axis, on actuation by the displaceable member of the switching device, to effect sufficient axial movement of the trigger member to bring the rebated portion of the trigger member into alignment with the or each sear member, the or each sear member is moved transversely towards the trigger member so as to release the tubular part for movement along said plunger axis, under the influence of the biasing means, to effect operation of an associated device.

Advantageously, the rebated portion of the trigger member is formed with an inclined surface for cooperating engagement with the or each sear member so that on transverse movement of the or each sear member under the influence of the biasing means urging the tubular part in said one direction, the or each sear member urges the trigger member in the same direction as the displaceable member of the seismonastic switching device.

A trigger mechanism such as this is preferably provided with an annular-section support member disposed between the trigger member and the tubular part and, in this form of construction, a plurality of balls respectively mounted in equiangularly spaced radial apertures formed in the support member may constitute radially movable sear members.

In one preferred construction, a compression spring is mounted between radial flanges respectively formed at one end of the support member and on the tubular part so as to urge the tubular part away from the radial flange formed on the support member.

In one practical form of such a trigger mechanism, the inclined surfaces of the trigger plunger and tubular part respectively constitute external and internal frusto-conical surfaces extending convergently towards the flanged end of the support member. Thus, on axial movement of the tubular part to compress the compression spring, the tubular part engages and displaces the trigger member into contact with the radially movable balls so as to move the balls radially outwards. The balls are then engaged with a further surface of the trigger member so as to block their return movement.

In an embodiment which is particularly suitable for preventing fuel spillage on roll-over of a motor vehicle, the flange of the support member forms part of a housing formed with a valve seat and the end of the tubular part remote from the flanged end of the support member is formed with a valve member which is engageable with the valve seat when the tubular part is released as a result of triggering movement of the trigger.

DESCRIPTION OF THE DRAWINGS

Embodiments of the inventions are hereinafter described, by way of example, with reference to the accompanying drawings, in which:

FIG. 1 is a sectional elevation of a seismonastic control apparatus including a seismonastic switching device embodying the present invention, and an electrical switch;

FIG. 2 is a sectional elevation of a modified form of seismonastic control apparatus including a preferred form of seismonastic switching device and electrical switches.

DESCRIPTION OF ILLUSTRATIVE EMBODIMENTS

Figure 3:
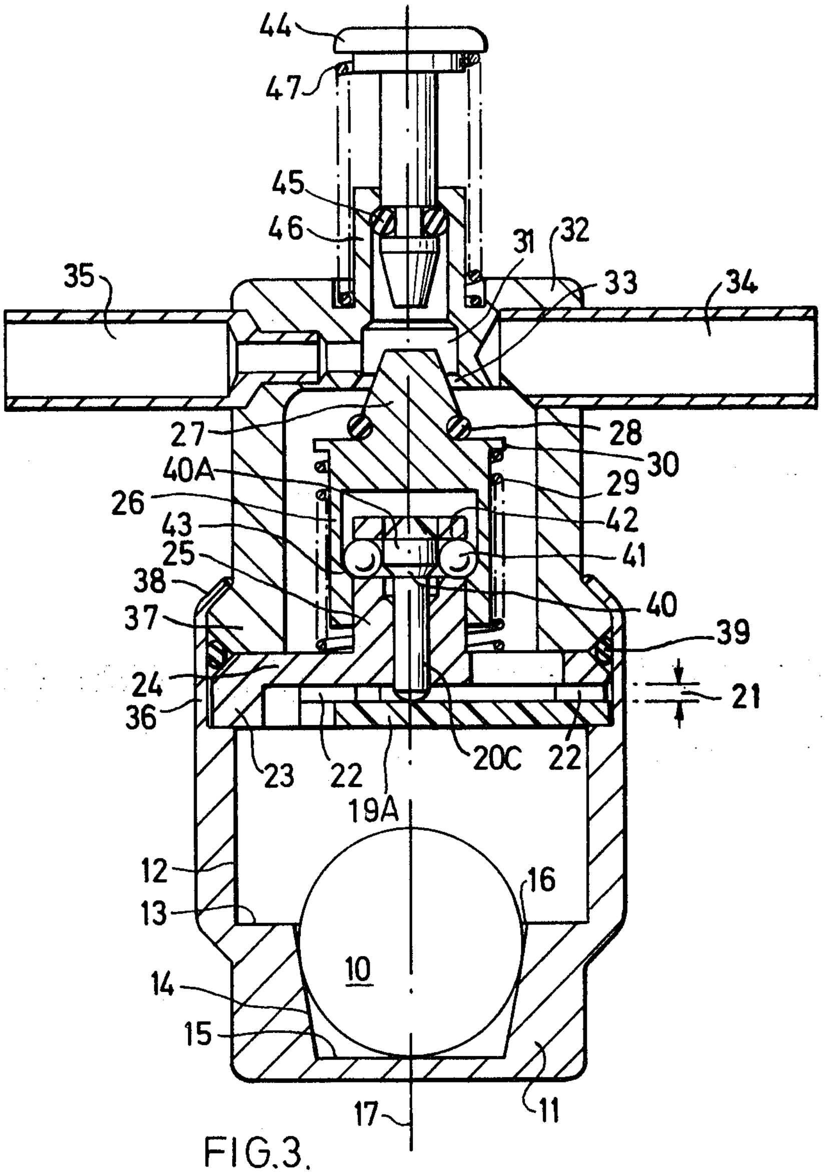
FIG. 3 is a sectional elevation of a seismonastic control apparatus including a seismonastic switching device, a liquid valve controlled thereby, and a trigger mechanism therebetween.

As shown in FIG. 1, a steel ball 10 is mounted in a chamber formed in a die-cast zinc alloy portion 11 of a housing, the chamber having a cylindrical upper wall 12, a planar seat surface 13, which is annular in shape, a frusto-conical seat surface 14 and a circular base surface 15. As shown, there is a circular edge 16 between the surfaces 13 and 14 and the diameter of the edge 16 is greater than the diameter of the ball 10 so as to allow the ball 10 to rest on the base surface 15.

The inclination $\alpha$ of the surface 14 to the central axis 17 of the switch equals 10° so that whenever the inclination $\beta$ of the resultant force $F_r$ acting on the ball 10 is greater than 80° there is a component force $F_\alpha$ equal to $-F_r\cos(\alpha+\beta)$ urging the ball 10 to roll upwards along the surface 14 towards the edge 16. When the ball 10 has completed this movement, it changes its direction of movement and follows the arcuate path 18 which progressively becomes more closely aligned with the direction of the resultant force $F_r$ and so the ball 10 rapidly accelerates to a velocity at which it has sufficient energy to lift a displaceable member, in the form of a plastics disc 19, against the weight of the plunger 19 and the resistance of the plunger 20A of a microswitch 20 through a distance 21 sufficient to operate microswitch 20 mounted in an upper portion 11A of the housing. As shown, the portions 11 and 11A of the housing define a counter bored portion of the chamber which limits axial movement of the plastic disc 19 to the distance 21. Upper portion 11A of the housing has a top closure part 11B, as shown. Microswitch 20 is encased in its own insulated housing 20D.

By simple calculation, it is possible to design the diameter and axial length of the cylindrical surface 12 so as to ensure that for a ball 10 of a given mass and a microswitch 20 having a plunger 20A of a given resistance, the ball 10 will have completely depressed the disc 19 and the plunger 20A, through the distance 21, when it has come to rest against the cylindrical wall 12. Wall 12 therefore prevents the ball 10 from jamming between the edge 16 and the disc 19 while also ensuring that the ball 10 will not return to its initial, rest position before the angle $\beta$, at which the resultant force $F_r$ is inclined to the central axis, falls below a predetermined value. In practice, this predetermined value is typically of the order of 30°.

The seismonastic switching device of the apparatus shown in FIG. 2 differs from that shown in FIG. 1 in that the seat surface 14 is a cylindrical surface which intersects the planar seat surface 13 at a circular edge 16 which is of smaller diameter than the ball 10. As shown, the ball 10 rests on the base surface 15, but this is not necessary. Moreover, micro switches 20 are disposed on opposite sides of the ball chamber formed in housing 11 so as to provide a directionally sensitive switch responsive to shock loading from opposite sides of the switch. In this case the ball 10 displaces the plungers 20B of the microswitches 20 directly, instead of through a displaceable member. Housing 11 is actually composed of lower portion 11C, lower side portions 11D, upper side portions 11E, and top portion 11F.

Clearly, formation of the ball chamber of the seismonastic switching device of the control apparatus shown in FIG. 2 is much simpler than formation of the ball chamber of the seismonastic switching device of the control apparatus shown in FIG. 1, because the seat surface 14 can be formed by drilling or cylindrical boring.

Operation of the modified switching device also compares favourably with the operation of the switching device shown in FIG. 1. Thus, when the inclination $\beta$ of the resultant force $F_r$ acting on the ball 10 increases beyond one half of the angle subtended at the centre of the ball by radii extending to diametrically opposite points on the circular edge 16, the ball 10 will lift. Moreover, as a result of the arcuate path 18 of the ball 10, this movement of the ball 10 will immediately result in an increase in the rate of acceleration of the ball 10, as hereinbefore described with reference to FIG. 1.

In the control apparatus illustrated in FIG. 3, a seismonastic switching device similar to that forming part of the control apparatus shown in FIG. 1 is connected to actuate a two-mode control device which, in this case, includes a petrol shut-off valve and a trigger mechanism therefor. In this case, the displaceable member is in the form of a plastics spider 19A having a central hub and three radial arms which are free to move through a distance 21 in slots 22 formed in the rim 23 of a flange 24 projecting radially from the base of an annular-section support member 25 of die-cast zinc alloy. A plunger in the form of a trigger member 20C rests on the spider 19A and is reciprocable by the spider 19A within the support member 25.

A tubular part, in the form of a brass shuttle sleeve 26, is mounted for reciprocation on the outer surface of the support member 25 and is integrally formed with a shuttle cone 27 bearing a rubber sealing ring 28. A helical compression spring 29 mounted between the radial flange 24 of the support member 25 and a radial flange 30 formed on the shuttle cone 27 urges the shuttle cone 27 into a recess 31 in a valve enclosing portion 32 of the housing so as to press the sealing ring 28 against a valve seat 33 at the mouth of the recess 31 so as to preventthe flow of liquid from an inlet pipe 34 to an outlet pipe 35. Although shown as separate components, the inlet pipes 34 and 35 may also be formed integrally with the valve enclosing portion 32 of the housing from die-cast zinc alloy.

As shown, the ball chamber of the housing portion 11 is formed with an internally relieved rim 36 to receive the flange 24 of the support member 25 and a rim 37 of the lower end of the housing portion 32. The rim 36 of the housing portion 11 has an upper edge which is bent over a frusto-conical surface formed on the rim 37 of the lower portion of the housing portion 32 so as to lock the different components together. The internal components enclosed by the ball chamber portion 11 and the housing portion 32 are apertured so as to allow fluid to fill the enclosed space and a rubber sealing ring 39 is compressed between bevelled edges of the rims 23 and 27 which are clamped together by the rim 36 of the housing portion 11.

When there is a change in the force field in which the valve assembly is situated; for example, when the seismonastic control apparatus is required to operate as a roll-over switch and the assembly is rotated through an angle of greater than 80°, about an axis extending perpendicular to the plane of the section shown in the drawing; the ball 10 begins to roll down the surface 14 and, when it reaches the edge 16, falls onto the surface 12 so as to displace the spider 19A along the axis 17.

During movement of the spider 19A through the distance 21, an abutment surface 40A bounded by the upper edge of a downwardly convergent frusto-conical surface 40 formed on the trigger member 20C rises above the radial plane containing the centres of radially movable balls 41 mounted in radial apertures 42 formed in the support member 25. As soon as this occurs, the balls 41 are urged inwardly by a downwardly convergent frusto-conical surface 43 formed internally of the shuttle sleeve 26 and this inward movement of the balls 41 assists in urging the trigger member 20C through the remainder of the distance 21 so that the balls 41 are moved radially out of the path of the surface 43 of the shuttle cone 27 into the aperture 31 and so press the sealing ring 28 against the valve seat 33. The downwardly convergent frusto-conical surface 40 terminates, as shown, in a rebated lower portion 40V of trigger member 20C. It will be noted that in the above described operation, the balls 41 each function as a sear member between the trigger plunger 26 and the trigger member 20C.

Thus, as a result of the operation of the seismonastic roll-over switching device and the consequential expenditure of a small amount of energy, a much greater amount of energy is released from the spring 29 which operates to actuate the liquid valve.

It will be readily apparent that the seismonastic switching device portion of FIG. 2 can be substituted for that of FIG. 1 in the FIG. 3 embodiment, if desired. That is, the seat surface 14 can be cylindrical rather than conical and the circular edge 16 can have a diameter less than rather than greater than that of the ball 10.

In order to reset the valve assembly, a plastics reset plunger 44 fitted with a rubber sealing ring 45 is reciprocably mounted in a tubular projection 46 extending co-axially from the top of the valve enclosing housing portion 32 and is resiliently held away from the shuttle cone 27 by means of a helical compression spring 47. By depressing the reset plunger 44 into contact with the shuttle cone 28, against the resistance of the spring 47, it is possible to press the shuttle sleeve 26 down over the support member 25 until there is sufficient radial clearance between the support member 25 and the shuttle sleeve 26 to allow the balls 41 to roll radially outwards along the radial apertures 42. On pressing the shuttle cone 27 still further, the upper end of the trigger member 20C is forced downwards until the frusto-conical surface 40 rides over the balls 41 and so causes the balls 41 to move radially outwards into their locking position. The reset plunger 44 is then released and returns to its rest position, as shown in FIG. 2, under the influence of the spring 47 and the assembly is again ready for actuation. Where a seismonastic switching device and a trigger mechanism are constructed in combination as a roll-over responsive device, it may be electrically coupled to, or formed as part of, a fuel valve which will allow motor vehicles to fulfill requirements S5.1, S5.2 and S5.5 of U.S. Motor Vehicle Safety Standard Nr. 301 relating to fuel system integrity to ensure that passenger cars and vehicles with G.V.W.R. of 6,000 lb. or less shall experience fuel spillages of less than 1 oz. per minute or 5 ozs. in total when rotated about their longitudinal axes by successive increments of 90° at a uniform rate in which 90° of rotation takes place in any time interval of from 1 to 3 minutes and, after rotation through each increment of 90°, the vehicles are held stationary for 5 minutes.

The term "seismonastic" as used in the specification and claims means shock responsive.

What is claimed is:

1. A seismonastic control apparatus comprising:

a two-mode control device operable, in different modes, to perform two different control functions and having a plunger which is moveable along a plunger axis and operable on actuating movement along said plunger axis, to effect a change of mode of said control device;

a housing enclosing said control device and defining a concave seat having a circular cross-section and a central axis extending parallel to an imaginary axis which extends parallel to the plunger axis;

a spherical seismonastic roller accommodated in the seat, for unobstructed radial movement from a rest position on the central axis of the seat as a result of a predetermined variation in the resultant of all forces acting on the roller;

a displaceable member supported in spaced relation to the seismonastic roller when the roller is in its rest position, the displaceable member having a part which is engageable with the plunger and parts defining a surface extending transversely of the central axis so that, on a predetermined extent of radial movement of the roller from its rest position, in any direction, the roller strikes said surface and moves said displaceable member away from the seat; and retaining means provided by the housing to ensure that said part of the displaceable member which is engageable with said plunger is moveable by an amount sufficient to effect said actuating movement of said plunger;

the seat defining a concave surface of revolution extending around said central axis and including a circular region which is engaged by the seismonastic roller during radial movement of said predetermined extent from its rest position and at which region there is an increase in the inclination of the surface of the seat to said central axis so that, in any axial plane, the increased inclination is greater than the inclination of the tangent to the roller at the point of contact between the roller and the seat when the roller is in its rest position.

2. Apparatus, according to claim 1, in which said retaining means limits axial movement of all said parts of said displaceable member to an amount at least as great as said amount sufficient to effect said actuating movement of said plunger.

3. Apparatus, according to claim 1, in which the region at which there is an increase in the inclination of the surface of the seat is a circular edge.

4. Apparatus, according to claim 3, in which:

said circular edge is smaller in diameter than the roller; and the surface of the seat has an inner portion which is cylindrical in shape and an outer portion which is planar and extends perpendicular to the central axis.

5. Apparatus, according to claim 3, in which the roller engages said region of the seat when in its rest position.

6. Apparatus, according to claim 1, in which a wall surrounds the surface of the seat and the distance between said wall and the region at which there is an increase in the inclination of the surface of the seat is such that, on said radial movement of predetermined extent, the roller rests against the wall.

7. Apparatus, according to claim 1, in which the two-mode control device has a tubular part which is reciprocable in said housing, along the plunger axis, the apparatus further comprising:

a plunger constituting an elongate trigger member which is axially reciprocable within said tubular part, along said plunger axis, and movable away from said seat by said displaceable member;

resilient biasing means disposed externally of the tubular part for urging said tubular part in one direction along said plunger axis;

guide means fixed relative to said housing and disposed between the trigger member and said tubular part; and at least one sear member mounted in said guide means for movement transversely of said plunger axis;

said tubular part being formed with an inclined internal surface for co-operating engagement with one side of said sear member, to urge said sear member radially inwards towards the trigger member, and the trigger member being formed with an abutment surface for engagement with said sear member to prevent said transverse movement and provided with a rebated portion of reduced cross-section which is axially spaced from the abutment surface, on the same side of the abutment surface as said displaceable member.

8. Apparatus, according to claim 7, in which the rebated portion of the trigger member is formed with an inclined external surface for co-operating engagement with said sear member so that on transverse movement of said sear member, under the influence of the resilient biasing means urging said tubular part in said one direction, said sear member urges the trigger member in the same direction as the trigger member is movable by said displaceable member.

9. Apparatus, according to claim 8, in which:

the guide means comprise an annular-section support member coaxially mounted on the plunger axis;

said support member is formed with a plurality of equiangularly spaced radial apertures; and a plurality of balls constituting sear members are respectively mounted in said radial apertures.

10. Apparatus, according to claim 9, in which:

the tubular part and the support member both have opposite ends which are proximate and distal to said displaceable member;

radial flanges are formed, respectively, at the distal end of said tubular part and at the proximate end of the support member;

the resilient biasing means comprise a compression spring which is mounted between said radial flanges so as to urge said tubular part away from the radial flange formed on the support member.

11. Apparatus, according to claim 10, in which:

the inclined internal and external surfaces of the tubular part and the trigger member respectively constitute frusto-conical surfaces which extend convergently towards the proximate end of the support member;

an internal portion of the distal end of the tubular part is arranged to engage one end of the trigger member so that, on axial movement of the tubular part to compress the compression spring, the frusto-conical surface of the trigger member is pressed into contact with the radially movable ball so as to move said balls radially upwards and the abutment surface on the trigger member is brought into engagement with the balls so as to block return movement of the balls.

12. Apparatus, according to claim 11, in which:

the flange formed at the proximate end of said support member forms part of said housing;

the distal end of said tubular part is formed as a valve sealing member; and the housing is formed with a valve seat which is cooperable with said valve sealing member when the tubular part is released on movement of the trigger member by the displaceable member.

* * * * *

UNITED STATES PATENT OFFICE
CERTIFICATE OF CORRECTION

Patent No. 4,097,698 Dated June 27, 1978

Inventor(s) Peter Ronald Jackman

It is certified that error appears in the above-identified patent and that said Letters Patent are hereby corrected as shown below:

Column 3, line 9, delete "to its operative position,"

Column 3, line 60, delete "a plunger" and insert a comma after "device"

Signed and Sealed this

***Sixteenth* Day of *January 1979***

[SEAL]

*Attest:*

RUTH C. MASON
*Attesting Officer*

DONALD W. BANNER
*Commissioner of Patents and Trademarks*